(12) United States Patent
Hovor et al.

(10) Patent No.: US 9,886,582 B2
(45) Date of Patent: Feb. 6, 2018

(54) CONTEXTUALIZATION OF THREAT DATA

(71) Applicant: Accenture Global Services Limited, Dublin (IE)

(72) Inventors: Elvis Hovor, Clarksburg, MD (US); David William Rozmiarek, Falls Church, VA (US); Robin Lynn Burkett, Alexandria, VA (US); Matthew Carver, Washington, DC (US); Mohamed H. El-Sharkawi, Lansdowne, VA (US)

(73) Assignee: Accenture Global Sevices Limited, Dublin (IE)

( * ) Notice: Subject to any disclaimer, the term of this patent is extended or adjusted under 35 U.S.C. 154(b) by 113 days.

(21) Appl. No.: 14/841,048

(22) Filed: Aug. 31, 2015

(65) Prior Publication Data

US 2017/0061132 A1    Mar. 2, 2017

(51) Int. Cl.
  *G06F 21/57* (2013.01)
  *G06F 3/0484* (2013.01)
  *H04L 29/06* (2006.01)

(52) U.S. Cl.
  CPC ........ *G06F 21/577* (2013.01); *G06F 3/04847* (2013.01); *H04L 63/1433* (2013.01); *G06F 2221/034* (2013.01); *G06F 2221/2101* (2013.01)

(58) Field of Classification Search
  CPC ................... H04L 63/1433; G06F 21/577
  See application file for complete search history.

(56) References Cited

U.S. PATENT DOCUMENTS 6,173,284 B1   1/2001   Brown
6,704,874 B1   3/2004   Porras
(Continued)

FOREIGN PATENT DOCUMENTS

EP   2 051 468   10/2012
EP   2770688     8/2014
(Continued)

OTHER PUBLICATIONS

Polepeddi, "Software Vulnerability Taxonomy Consolidation," Thesis, Jan. 5, 2005, 43 pages. Retreived from the Internet: URL: http://www.osti.gov/bridge/product.biblio.jsp?osti_id=15020074 [retrieved on Nov. 2, 2007].

(Continued)

*Primary Examiner* — John B King
*Assistant Examiner* — Arya Golriz
(74) *Attorney, Agent, or Firm* — Fish & Richardson P.C.

(57) ABSTRACT

Methods, systems, and apparatus, including computer programs encoded on computer storage media, for determining threat data contextualization. One of the methods includes receiving data that identifies assets, attributes for each of the assets, and respective relevance ratings for the assets, receiving threat data that identifies vulnerabilities of particular attributes, determining vulnerability trends for the particular attributes, determining whether an attribute is one of the particular attributes identified in the threat data, updating the relevance ratings of the attribute using the vulnerability trends for the attribute, for each of two or more vulnerabilities identified in the threat data: determining the particular attributes affected by the vulnerability, and determining a score for the vulnerability using the respective relevance ratings for the particular attributes affected by the vulnerability, generating a ranking of the vulnerabilities using the corresponding scores, and generating instructions for pre- (Continued)

sentation of a user interface that identifies each of the vulnerabilities.

21 Claims, 7 Drawing Sheets

(56) References Cited

U.S. PATENT DOCUMENTS

| | | | |
|---|---|---|---|
| 7,203,693 | B2 | 4/2007 | Carlbom et al. |
| 7,523,137 | B2 | 4/2009 | Kass et al. |
| 8,024,795 | B2 | 9/2011 | Newton |
| 8,272,061 | B1 | 9/2012 | Lotem et al. |
| 8,407,798 | B1 | 3/2013 | Lotem et al. |
| 8,463,790 | B1 | 6/2013 | Joshi et al. |
| 8,504,879 | B2 | 8/2013 | Poletto et al. |
| 8,516,104 | B1 | 8/2013 | Liu et al. |
| 8,538,911 | B2 | 9/2013 | Kass et al. |
| 8,832,832 | B1* | 9/2014 | Visbal ............... H04L 63/1441 726/22 |
| 8,966,639 | B1 | 2/2015 | Roytman et al. |
| 8,984,643 | B1 | 3/2015 | Krisher et al. |
| 9,118,617 | B1 | 8/2015 | Giroux et al. |
| 9,407,645 | B2 | 8/2016 | Modi et al. |
| 9,503,467 | B2 | 11/2016 | Lefebvre et al. |
| 2002/0078381 | A1 | 6/2002 | Farley |
| 2003/0033318 | A1 | 2/2003 | Carlbom et al. |
| 2003/0093514 | A1 | 5/2003 | Valdes et al. |
| 2003/0182310 | A1 | 9/2003 | Charnock et al. |
| 2004/0024738 | A1 | 2/2004 | Yamane et al. |
| 2004/0158479 | A1* | 8/2004 | Adhikari ............... G06Q 10/10 705/59 |
| 2004/0250122 | A1* | 12/2004 | Newton ............... H04L 63/1425 726/2 |
| 2005/0071445 | A1 | 3/2005 | Siorek |
| 2005/0091542 | A1 | 4/2005 | Banzhof |
| 2005/0114493 | A1 | 5/2005 | Mandato et al. |
| 2005/0138413 | A1 | 6/2005 | Lippman et al. |
| 2005/0185823 | A1 | 8/2005 | Brown et al. |
| 2006/0004826 | A1 | 1/2006 | Zartler et al. |
| 2006/0230071 | A1 | 10/2006 | Kass et al. |
| 2007/0067848 | A1 | 3/2007 | Gustave et al. |
| 2007/0112941 | A2 | 5/2007 | Oliphant |
| 2007/0278220 | A1 | 12/2007 | Bostick et al. |
| 2008/0005796 | A1 | 1/2008 | Godwood |
| 2008/0109730 | A1 | 5/2008 | Coffman et al. |
| 2008/0229149 | A1* | 9/2008 | Penton ............... G06F 11/36 714/30 |
| 2008/0276111 | A1 | 11/2008 | Jacoby et al. |
| 2008/0295172 | A1 | 11/2008 | Bohacek |
| 2008/0307525 | A1 | 12/2008 | Nickle |
| 2009/0038015 | A1 | 2/2009 | Diamant et al. |
| 2009/0219154 | A1 | 9/2009 | Kukula |
| 2009/0303055 | A1 | 12/2009 | Anderson et al. |
| 2010/0071061 | A1 | 3/2010 | Crovella et al. |
| 2010/0180344 | A1 | 7/2010 | Malyshev |
| 2010/0223499 | A1 | 9/2010 | Panigrahy |
| 2010/0254088 | A1 | 10/2010 | Ishida et al. |
| 2011/0185421 | A1 | 7/2011 | Wittenstein |
| 2011/0185422 | A1 | 7/2011 | Khayam |
| 2012/0096549 | A1 | 4/2012 | Amini et al. |
| 2012/0123822 | A1 | 5/2012 | Hnatio |
| 2012/0173710 | A1 | 7/2012 | Rodriguez |
| 2012/0254088 | A9 | 10/2012 | Kass et al. |
| 2013/0019008 | A1 | 1/2013 | Jorgenson |
| 2013/0031635 | A1 | 1/2013 | Lotem et al. |
| 2013/0049955 | A1 | 2/2013 | Hoover et al. |
| 2013/0239177 | A1 | 9/2013 | Sigurdson et al. |
| 2013/0339341 | A1 | 12/2013 | Fan et al. |
| 2014/0157405 | A1 | 6/2014 | Joll |
| 2014/0157415 | A1 | 6/2014 | Abercrombie et al. |
| 2014/0172495 | A1* | 6/2014 | Schneck ............... G06Q 10/0635 705/7.28 |
| 2014/0189873 | A1 | 7/2014 | Elder et al. |
| 2015/0237062 | A1* | 8/2015 | Roytman ............... G06F 21/577 726/25 |
| 2015/0242637 | A1 | 8/2015 | Tonn et al. |
| 2015/0341379 | A1 | 11/2015 | Lefebvre et al. |
| 2016/0065598 | A1 | 3/2016 | Modi et al. |
| 2016/0065599 | A1 | 3/2016 | Hovor et al. |
| 2016/0188882 | A1* | 6/2016 | Mahrous ............... G06F 21/577 726/25 |
| 2016/0261640 | A1 | 9/2016 | Modi et al. |
| 2016/0352768 | A1 | 12/2016 | Lefebvre et al. |

FOREIGN PATENT DOCUMENTS

| | | |
|---|---|---|
| JP | 06250911 | 9/1994 |
| WO | WO 2005/107414 | 11/2005 |
| WO | WO 2005/111805 | 11/2005 |
| WO | WO 2011/095988 | 8/2011 |
| WO | WO 2013/014672 | 1/2013 |
| WO | WO 2013/109374 | 7/2013 |

OTHER PUBLICATIONS

Office action in AU Application No. 2015202706, dated Mar. 8, 2016, 2 pages.
"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.
"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.
"Protect Your PEO," crowdstrike.com [online] retrieved on Jul. 15, 2015. Retrieved from the Internet: <URL: http://www.crowdstrike.com>, 2 pages.
"The KBMS-Prototype KRISYS User Manual" Dec. 1992 (Dec. 1992), p. 1-94, XP002193794.
Accenture, "Discover What Your Customers Really Think," 2 pages, Accenture 2005.
Allan et al.: "Taking Topic Detection From Evaluation to Practice" Proceedings of the 38th International Conference on System Sciences, Jan. 3, 2005 (Jan. 3, 2005), 10 pages, XP010762602.
Barnum, "Standardizing cyber threat intelligence information with the structured threat information eXpression (STIX)," Version 1.1; Revision 1, MITRE, Feb. 2014, 22 pages.
Bird and Loper, "NLTK: The Natural Language Toolkit," Proceedings of the ACL demonstration session, Barcelona, Association for Computational Linguistics, pp. 214-217. Jul. 2004.
Bird, "NLTK-Lite: Efficient Scripting for Natural Language Processing," Proceedings of the 4th International Conference on Natural Language Processing (ICON). pp. 11-18, Kanpur, India. New Delhi: Allied Publishers. Dec. 2005.
Birnbaum et al., "Analogy, Intelligent IR, and Knowledge Integration for Intelligence Analysis" Ai Technologies for Homeland Security, Papers From the 2005 Aaai Spring Symposium, Mar. 21, 2005 (Mar. 21, 2005), XP002390865 Menlo Park, CA Retrieved from the Internet: URL:http://www.infolab.northwestern.edu/infolab/downloads/papers/paper10142.pdf> [retrieved on Jul. 19, 2006], 6 pages (and Search Report).
Bloglines, Create a Personal Bloglines Page Loaded with the Freshest News About the Things You Love, 1p., 2003.
Chung and Mcleod: "Dynamic Topic Mining from News stream Data" COOPIS/DOA/ODBASE 2003, [Online] 2003, pp. 653-670, XP002391208 Retrieved from the Internet:URL:http://www.springerlink.com/(zb2dxr55xIjuq5453e2bnj55)/app/home/contribution.asp?referrer=parent&backto=issue,42,95;journal,1127,3908;linkingpublicationresults,1:105633,1> [retrieved on Jul. 19, 2006].
ClearforestText-Driven Business Intelligence, ClearForest Tagging & Extraction Platform, 2 pages, 2006.
Genalytics, Inc., "Building Next Generation Predictive Models Using Genetic Algorithm-based Software," <URL: http://genalytics.com>, 27 pages, 2003.

(56) References Cited

OTHER PUBLICATIONS

Genalytics, Inc., "Genalytics Auto: List Management Solution for Driving Successful Campaigns," 2 pages, 2006.
Genalytics, Inc., "Genalytics DB Extract: Advanced Data Extraction, Transformation and Scoring for Enterprise Data," 2 pages, 2006.
Genalytics, Inc., "Genalytics Knowledge Extract: Extract Meaning from Your Uninstructed Data," 2 pages, 2004.
Genalytics, Inc., "Genalytics Model, Leverage More Data, Create Better Models," 2 pages, 2006.
Genalytics, Inc., "Genalytics Phone: Phone Append our Reverse Look Up to Validate or Target your Prospects," 1 page, 2005.
Genalytics, Inc., "Genalytics Prospect, Automated Analytics and Targeted Analytics and Targeted Lists," 1 page, 2006.
Genalytics, Inc., "Taming the Analytic Data Monster: An Advanced Approach to Data Extraction and Transformation for Enterprise Analytics," 12 pages, 2004.
Intelliseek, Brandpulse Products, BrandPulse 360™, 2 pages 1997-2006.
Intelliseek, Brandpulse Products, BrandPulse CRM™, 2 pages, 1997-2006.
Intelliseek, Brandpulse Products, BrandPulse Internet™, 2 pages, 1997-2006.
Intelliseek, Brandpulse Products, BrandPulse™ Direct, 2 pages, 1997-2006.
Intelliseek, Brandpulse Products, BrandPulse™ Overview, 2 pages, 1997-2006.
Inxight, "Inxight SmartDiscovery™ Analysis Adapters and Connectors," 2 pages, Inxight Software Inc., 2005.
Inxight, "Inxight SmartDiscovery™ The Complete Solution for Enterprise Information Discovery," <URL:www.inxight.com> 4 pages, 2005.
Inxight, "Inxight ThingFinder Advanced with Custom Entity Extraction," 1page, 2006.
Liu and Singh, "ConceptNet—a practical commonsense reasoning tool-kit" Bt Technol J; Bt Technology Journal Oct. 2004, [Online] vol. 22, No. 4, Oct. 2004 (Oct. 2004), pp. 211-226, XP002391209. Retrieved from the Internet: URL:http://web.media.mit.edu/{push/Concept Net-BTTJ.pdf> [retrieved on Jul. 19, 2006].
Loper and Bird, "NLTK: The Natural Language Toolkit," Proceedings of the ACL Workshop on Effective Tools and Methodologies for Teaching Natural Language Processing and Computational Linguistics, Philadelphia, Association for Computational Linguistics, pp. 62-69. Jul. 2002.
Makkonen, "Investigations on Event Evolution in TDT" CITESEER, [Online] 2003, XP002391206. Retrieved From the Internet: URL:Http://Citeseer.Ist.Psu.Edu/706354.Htm 1> [Retrieved on Jul. 19, 2006], 6 pages.
McCallum, "Bow: A Toolkit for Statistical Language Modeling, Text Retrieval Classification and Clustering," 2 pages, Sep. 12, 1998.
McCallum, "Rainbow," 6 pages, Sep. 30, 1998.
Nallapati et al., "Event threading within news topics" Proceedings of the Thirteenth Acm Conference on Information and Knowledge Management (CIKM), [Online] 2004, pp. 446-453, XP002390646. Retrieved from the Internet: URL:http://www.cs.umass.edu/{nmramesh/p425-nallapati .pdf> [retrieved on Jul. 19, 2006].
Soderland, "Learning information extraction rules for semi-structured and free text" Machine Learning Kluwer Academic Publishers Netherlands, [Online] vol. 34, No. 1-3, Feb. 1999 (Feb. 1999), pp. 233-272, XP002391210, ISSN: 0885-6125. Retrieved from the Internet: URL:http://www.springerlink.com/media/f62clcrrlncvnj23recn/contributions/m/2/3/n/m23n8197vg924t51.pdf> [retrieved on Jul. 19, 2006].
STIX, "Structured Threat Information eXpression—STIX—A structured language for cyber threat intelligence information," MITRE, <URL: https://stix.mitre.org>, Jul. 2013, 2 pages.
Technorati™, "About Technorati, Currently Tracking 31 Million Sites and 2.2 Billion links," 1 page, 2006.

Yahoo! Inc., "Imagine all your favorite things on one page. That's My Yahoo!" www.yahoo.com. Sign In, 1page, 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http://ieeexplore.ieee.org/iel5/5254/17016/00784083.pdf?tp=&arnumber=784083&isnumber=17016> [retrieved on Jul. 19, 2006].
Canadian first Examiner's Report for Application No. 2,602,564 dated Mar. 1, 2013, 2 pages.
European Patent Office dated Dec. 18, 2007 for co-pending European Patent Office Application No. 07253957.0, 8 pages.
European Patent Office dated Feb. 4, 2008 for co-pending European Patent Office Application No. 06 742 600.7, 3 pages.
Extended European Search Report in Application No. 15168872.8, dated Oct. 20, 2015, 6 pages.
Office action in AU Application No. 2015202706, dated Oct. 30, 2015, 3 pages.
PCT International Preliminary Report on Patentability for Application No. PCT/EP2006/003533 dated Oct. 18, 2007, 13 pages.
PCT Notification of Transmittal of the International Search Report and the Written Opinion for International Application No. PCT/EP2006/003533 dated Sep. 8, 2006, 18 pages.
U.S. Appl. No. 13/975,993, "Identifying and classifying non-functional requirements in text," Aug. 26, 2013, 56 pages.
U.S. Final Office Action for U.S. Appl. No. 11/387,173 dated Aug. 14, 2008, 16 pages.
U.S. Final Office Action for U.S. Appl. No. 12/405,026 dated Dec. 12, 2011, 21 pages.
U.S. Non-Final Office Action for U.S. Appl. No. 11/387,173 dated Feb. 22, 2008, 16 pages.
U.S. Non-Final Office Action for U.S. Appl. No. 12/405,026 dated May 4, 2011, 19 pages.
U.S. Non-Final Office Action for U.S. Appl. No. 14/285,487 dated Oct. 7, 2015, 22 pages.
U.S. Non-Final Office Action for U.S. Appl. No. 14/473,730 dated Aug. 23, 2015, 29 pages.
U.S. Notice of Allowance for U.S. Appl. No. 11/387,173 dated Dec. 12, 2008, 19 pages.
U.S. Notice of Allowance for U.S. Appl. No. 12/405,026 dated Apr. 25, 2012, 13 pages.
U.S. Notice of Allowance for U.S. Appl. No. 12/405,026 dated Jun. 12, 2013, 21 pages.
Srinivasan et al, "A self-organized agent-based architecture for power-aware intrusion detection in wireless ad-hoc networks," Computing & Informatics, IEEE 2006, 6 pages.
Office Action in AU Application No. 2015213316, dated May 6, 2016, 3 pages.
Office Action in AU Application No. 2015213391, dated May 15, 2016, 3 pages.
European Extended Search Report for Application No. 16184251.3, dated Jan. 5, 2017, 7 pages.
U.S. Notice of Allowance for U.S. Appl. No. 15/155,328, dated Jan. 13, 2017, 18 pages.
Anonymous: "Characterizing Malware with MAEC and STIX," [Apr. 21, 2014]. Retrieved from: URL:http://stixproject.github.io/about/Characterizing_Malware_MAEC_and_STIX_v1.0.pdf [retrieved on Jul. 12, 2015] 8 pages.
Farnham et al., "Tools and Standards for Cyber Threat Intelligence Projects," SANs Institute InfoSec Ready Room, pp. 2-21 (Oct. 14, 2013).
Extended European Search Report in Application No. 15181386.2, dated Dec. 16, 2015, 10 pages.
Australian Office Action for Application No. 2016247167, dated Dec. 20, 2016, 6 pages.
Australian Office Action for Application No. 2016219666, dated Oct. 14, 2016, 6 pages.
European Extended Search Report for Application No. 16186243.8, dated Nov. 15, 2016, 5 pages.
Australian Office Action for Application No. 2016216520, dated Oct. 7, 2016, 4 pages.
U.S. Notice of Allowance for U.S. Appl. No. 14/285,487 dated Jun. 8, 2016, 14 pages.

(56) References Cited

OTHER PUBLICATIONS

U.S. Final Office Action for U.S. Appl. No. 14/285,487, dated Mar. 2, 2016, 24 pages.
U.S. Non-Final Office Action for U.S. Appl. No. 14/473,743, dated Aug. 18, 2016, 18 pages.
U.S. Notice of Allowance for U.S. Appl. No. 14/473,730, dated Mar. 1, 2016, 9 pages.
Australian Office Action for Application No. 2016119666, dated Jul. 25, 2017, 5 pages.
Australian Office Action for Application No. 2015213316, dated May 8, 2017, 5 pages.
European Office Action for Application No. 15181386.2, dated Aug. 25, 2017, 4 pages.
Canadian Office Action for Application No. 2,938,337, dated Jun. 21, 2017, 4 pages.
Srinivasan et al., "A system for power-aware agent-based intrusion detection (SPAID) in wireless ad hoc networks," Proceeding ICCNMC'05 Proceedings of the Third international conference on Networking and Mobile Computing, 2005, pp. 153-162.
Australian Office Action for Application No. 2016219666, dated Apr. 7, 2017, 4 pages.
Australian Office Action for Application No. 2016216520, dated May 11, 2017, 3 pages.
U.S. Notice of Allowance for U.S. Appl. No. 15/235,247, dated Apr. 18, 2017, 12 pages.
Canadian Office Action for Application No. 2,939,279, dated Jun. 29, 2017, 5 pages.
Polepeddi, "Software Vulnerability Taxonomy Consolidation," Thesis, Jan. 5, 2005, 43 pages. Retreived from the Internet: URL: http://www.osti.gov/bridge/product.biblio.jsp?osti_id=15020074 [retrieved on Nov. 2, 2007].
Extended European Search Report in Application No. 15181400.1 dated Jan. 27, 2016, 7 pages.

\* cited by examiner $T_1$ {

| Asset Inventory 202 ||||||||
|---|---|---|---|---|---|---|---|
| Asset ID | Model | Software | Version | IP Address | Criticality | Rating | BI |
| 100 | PowerEdge T110 | SAP | 4.7 | 10.5.12… | Critical | 100 | 1,2,3 |
| 101 | ES40 | WebSphere | 5.5 | 174.30… | High | 80 | 1,4 |
| 108 | IBM DL380P | Apache | 2.2 | 10.8.30… | Low | 20 | 2,3 |
| 110 | ES20 | Java | 4.0 | 192.16… | Medium | 50 | 4 |

206   208  210  212

| Business Imperatives 204 ||
|---|---|
| Imperative ID | Business Imperative |
| 1 | Protect all intellectual property residing on Technology Lab's servers |
| 2 | Ensure personally identifiable information of lab members is secure |
| 3 | Provide lab members with 97% service availability of all technical resources contained in cyber range. |
| 4 | Protect brand integrity by minimizing website defacement |

214

$T_2$ {

| Asset Inventory: Asset Relevance Scores ||||||||
|---|---|---|---|---|---|---|---|
| Asset ID | Model | Software | Version | IP Address | Criticality | Rating | BI |
| 100 | PowerEdge T110  5 | SAP  40 | 4.7  40 | 10.5.12…  15 | Critical | 100 | 1,2,3 |
| 101 | ES40  4 | WebSphere  32 | 5.5  32 | 174.30…  12 | High | 80 | 1,4 |
| 108 | IBM DL380P  1 | Apache  8 | 2.2  8 | 10.8.30…  3 | Low | 20 | 2,3 |
| 110 | ES20  2.5 | Java  20 | 4.0  20 | 192.16…  7.5 | Medium | 50 | 4 |

FIG. 2A

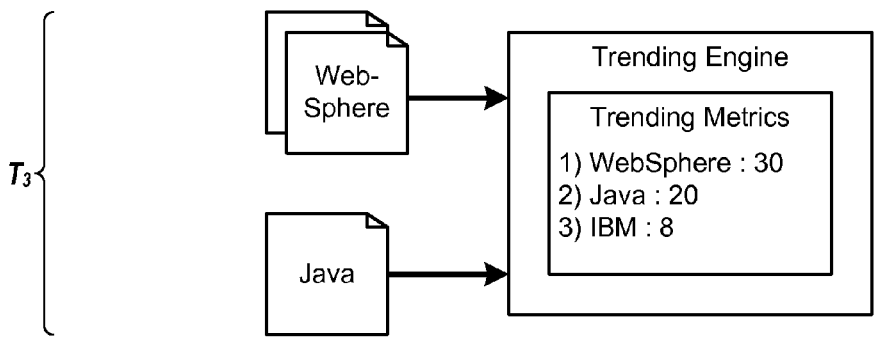

Asset Inventory: Update Asset Relevance Scores Using Trending

| Asset ID | Model | Software | Version | IP Address | Criticality | Rating | BI |
|---|---|---|---|---|---|---|---|
| 100 | PowerEdge T110 5 | SAP 40 | 4.7 40 | 10.5.12...15 | Critical | 100 | 1,2,3 |
| 101 | ES40 4 | WebSphere 32+20 = 52 | 5.5 32 | 174.30...12 | Critical | 80+20 = 100 | 1,4 |
| 108 | IBM DL380P 1+5 = 6 | Apache 8 | 2.2 8 | 10.8.30...3 | Low | 20+5 = 25 | 2,3 |
| 110 | ES20 2.5 | Java 20+10 = 30 | 4.0 20 | 192.16...7.5 | Medium | 50+10 = 60 | 4 |

206  208  210

Asset Inventory: Business Imperative Scores

| Asset ID | Model | Software | Version | IP Address | Criticality | BI |
|---|---|---|---|---|---|---|
| 101 | ES40 12.5 | WebSphere 12.5 | 5.5 12.5 | 174.30... 12.5 | Critical | 1, 4 |
| 110 | ES20 12.5 | Java 12.5 | 4.0 12.5 | 192.16... 12.5 | Medium | 4 |

FIG. 2B $T_8$ {

| User Interface 216 ||||
|---|---|---|---|
| Threat Data | Affected Assets | Asset Relevance Score ▼ | BI Relevance Score ▼ |
| Exploit Target m | 101, 108, 110 | 88 | 25 ▼ |
| Exploit Target 1 | 115, 116, 132, 201, 202, 203 ... | ... | ... |
| Exploit Target 5 | 110, 115 | ... | ... |
| Exploit Target 2 | 100, 101, 107, 110 | ... | ... |

218    220    222    224

$T_9$ {

User Interface 226

Title: Security Bulletin Advance Notification for December 2014
Tracking ID: 912536
Date/Time: 05 Dec 2014 14:52:04 UTC
Priority: 3
Category: Upcoming Events
Audience: Analysts, Affiliates, . . .
Description: This is an advance notification of security bulletins that . . .

Bulletin ID Maximum Severity Rating and Vulnerability Impact
Bulletin 1 Important . . .
Bulletin 2 Critical . . .
Bulletin 3 Critical . . .

⋮

| Element Extracted | Match |
|---|---|
| Sender Address: | Sender Address: |

⋮

( Create Service Ticket )— 228

FIG. 2D $T_{10}${ | Threat Detail: WebSphere 5.5 vulnerability
COA: Update to version 6.0

$T_{11}${ | Update WebSphere to version 6.0

$T_{12}${ | Update Asset Inventory to reflect changes $T_{13}${

| Asset Inventory | | | | | | | |
|---|---|---|---|---|---|---|---|
| Asset ID | Model | Software | Version | IP Address | Criticality | Rating | BI |
| 100 | PowerEdge T110 | SAP | 4.7 | 10.5.12... | Critical | 100 | 1,2,3 |
| 101 | ES40 | WebSphere | 6.0 | 174.30... | High | 80 | 1,4 |
| 108 | IBM DL380P | Apache | 2.2 | 10.8.30... | Low | 20 | 2,3 |
| 110 | ES20 | Java | 4.0 | 192.16... | Medium | 50 | 4 |

FIG. 2E

CONTEXTUALIZATION OF THREAT DATA

BACKGROUND

Some entities in the security industry face an increasing necessity to understand the impact and priorities of cyber threats against entities, while being constrained by limited resources to respond by adapting controls and validating patches. For instance, some threat actors and vectors have a significantly disproportionate growth and presence compared to that of practical, scalable remediation approaches.

SUMMARY

In general, one innovative aspect of the subject matter described in this specification can be embodied in methods that include the actions of receiving data that identifies an entity's computer assets, attributes for each of the entity's computer assets, and respective relevance ratings for each of the entity's computer assets, receiving threat data that identifies vulnerabilities of particular attributes, the threat data including two or more subsets of threat data each of which identifies a vulnerability of a different one of the particular attributes, determining, by analyzing the threat data, vulnerability trends for the particular attributes, determining, for each of the attributes, whether the attribute is one of the particular attributes identified in the threat data, updating, for each of the attributes that is one of the particular attributes identified in the threat data, the respective relevance ratings of the corresponding attribute using the vulnerability trends for the attribute, for each of two or more vulnerabilities identified in the threat data: determining the particular attributes affected by the vulnerability, and determining a score for the vulnerability using the respective relevance ratings for the particular attributes affected by the vulnerability, generating a ranking of the two or more vulnerabilities using the corresponding scores, generating instructions for presentation of a user interface that identifies each of the two or more vulnerabilities according to the ranking, providing the instructions to a device to cause the device to present the user interface to a user to allow the user to change the entity's computer assets or the attributes of the entity's computer assets based on the vulnerabilities, and receiving an indication of a change to the entity's computer assets or the attributes of the entity's computer assets. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving, from a device, a request for presentation of threat information to a user, wherein determining, by analyzing the threat data, the vulnerability trends for the particular attributes comprises determining, by analyzing the threat data, the vulnerability trends for the particular attributes in response to receiving the request for presentation of the threat information to a user. The method may include updating, for the entity's computer asset that includes the changed attribute, the updated relevance rating in response to receiving the indication of the change to the attributes of the entity's computer assets.

In some implementations, receiving the data that identifies the entity's computer assets, the attributes for each of the entity's computer assets, and the respective relevance ratings for each of the entity's computer assets may include receiving data that identifies an entity's computer assets, attributes for each of the entity's computer assets, which of the entity's computer assets and corresponding attributes are used for each of the entity's business imperatives, and respective relevance ratings for each of the entity's computer assets, and determining the score for the vulnerability using the respective relevance ratings for the particular attributes affected by the vulnerability may include determining a score for the vulnerability using the business imperatives that use the computer assets with the particular attributes affected by the vulnerability. Determining the score for the vulnerability using the business imperatives that use the computer assets with the particular attributes affected by the vulnerability may include determining, for a highest priority business imperative included in the entity's business imperatives that uses at least one of the particular attributes affected by the vulnerability, a score for each of the particular attributes for the computer assets used by the highest priority business imperative using a total quantity of attributes used by the highest priority business imperative, and determining, for the highest priority business imperative that uses at least one of the particular attributes affected by the vulnerability, a total score for the highest priority business imperative using the scores for each of the particular attributes for the computer assets used by the highest priority business imperative.

In some implementations, receiving the data that identifies the entity's computer assets, attributes for each of the entity's computer assets, which of the entity's computer assets are used for each of the entity's business imperatives, and the respective relevance ratings for each of the entity's computer assets may include providing, for presentation to a user, a user interface for input of identifiers for the entity's computer assets, the respective relevance ratings and the attributes for each of the entity's computer assets, and the business imperatives, and receiving the data including the identifiers for the entity's computer assets, the respective relevance ratings and the attributes for each of the entity's computer assets, and the business imperatives in response to user interaction with the user interface. Receiving the threat data that identifies the vulnerabilities of the particular attributes may include receiving structured threat data or unstructured threat data from a computer connected to the data processing apparatus by a network connection, and parsing the structured threat data or the unstructured threat data to determine the vulnerabilities and the particular attributes identified in the threat data.

In some implementations, determining, by analyzing the threat data, the vulnerability trends for the particular attributes may include determining, for each of the particular attributes, a quantity of times the particular attribute is identified in the threat data. Determining, for each of the attributes, whether the attribute is one of the particular attributes identified in the threat data may include comparing, for each of the attributes, a name for the attribute or an alternate spelling of the name for the attribute with a string, for each of the particular attributes, from the threat data that identifies the particular attribute, and determining, for each of the attributes, that the attribute is one of the particular attributes when the name or the alternate spelling of the name is the same as one of the strings that identifies a corresponding one of the particular attributes.

In some implementations, updating, for each of the attributes that is one of the particular attributes identified in the threat data, the respective relevance ratings of the corresponding attribute using the vulnerability trends for the attribute may include for each of the attributes that is one of the particular attributes identified in the threat data: determining a weight for the respective relevance rating of the corresponding attribute using the vulnerability trends for the attribute, and applying the weight to the respective relevance rating. Determining, by analyzing the threat data, the vulnerability trends for the particular attribute may include determining a quantity of times the particular attribute is identified in the threat data, determining the weight for the respective relevance rating of the corresponding computer asset using the vulnerability trends for the attribute may include determining whether the quantity of times the attribute is identified in the threat data satisfies a threshold value, and selecting a first weight in response to determining that the quantity of times the attribute is identified in the threat data satisfies the threshold value, or selecting a second weight in response to determining that the quantity of times the attribute is identified in the threat data does not satisfy the threshold value, and applying the weight to the respective relevance rating comprises adding the selected weight value to the respective relevance rating to determine an updated relevance rating for the corresponding attribute.

In some implementations, the method may include determining a particular industry for the entity, determining, for each of the subsets of threat data, an industry for the subset of threat data, and including, for each of the subsets of threat data with an industry that is the same as the particular industry, the subset of threat data in the ranking.

In some implementations determining the score for the vulnerability using the respective relevance ratings for the particular attributes affected by the vulnerability comprises determining a score for the vulnerability using the updated respective relevance ratings for the attribute that is affected by the vulnerability.

In some implementations receiving the data that identifies the entity's computer assets, the attributes for each of the entity's computer assets, and the respective relevance ratings for each of the entity's computer assets comprises receiving data representing user input indicating the respective relevance ratings for each of the entity's computer assets.

The subject matter described in this specification can be implemented in particular embodiments and may result in one or more of the following advantages. In some implementations, a system using the components and methods described below may provide a ranking of vulnerabilities to determine or assist a user in determining which vulnerabilities should be acted on before other vulnerabilities that affect an entity. In some implementations, the systems and methods described below are specific to a particular entity and facilitate the entity acting on vulnerabilities before they happen, as they happen, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-E show a flow diagram of a process for updating an asset inventory in response to a change in an entity's computer assets.

Like reference numbers and designations in the various drawings indicate like elements.

DETAILED DESCRIPTION

Figure 1:
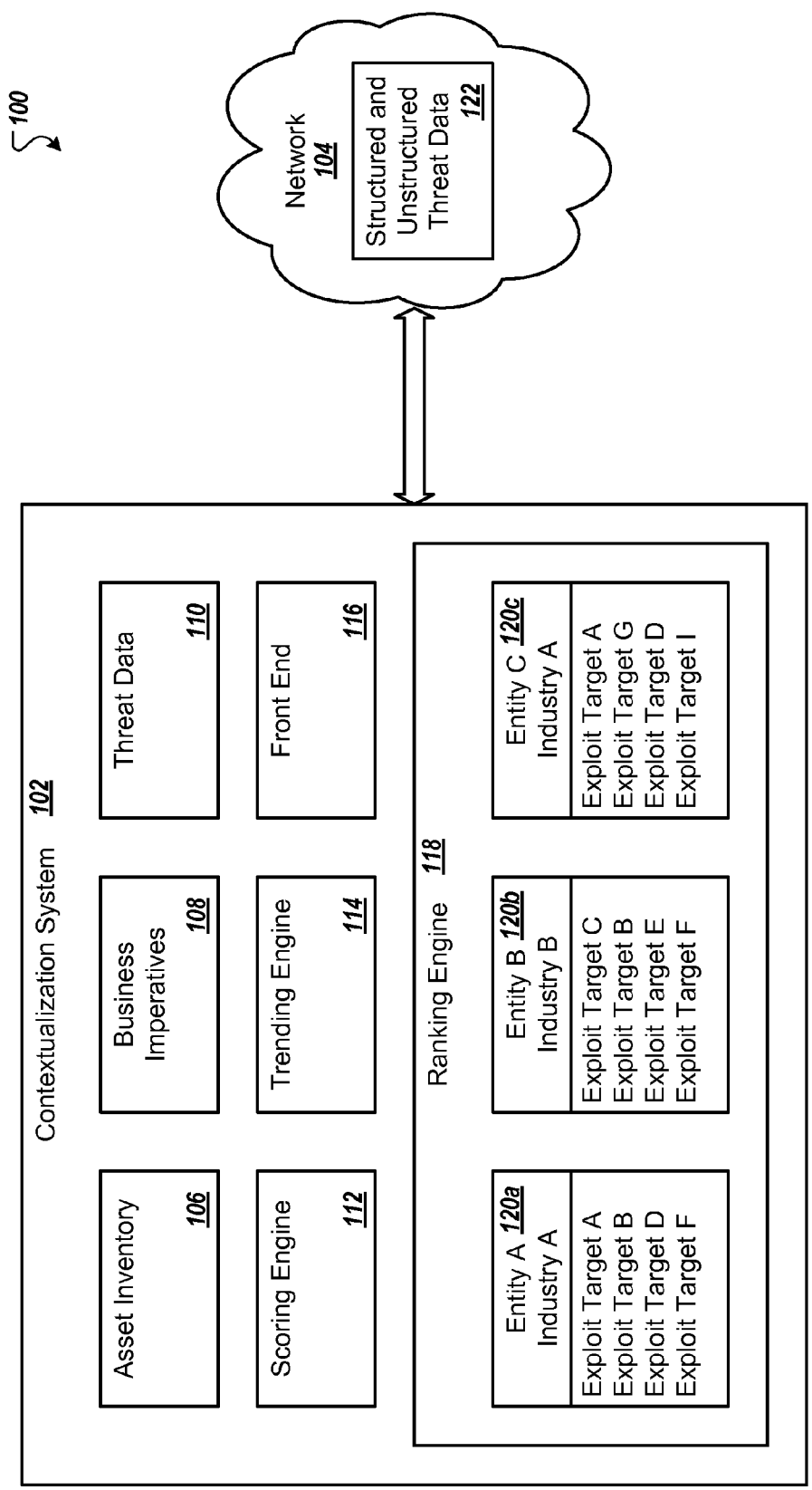
FIG. 1 is an example of an environment in which a contextualization system receives threat data from a network and ranks vulnerabilities identified in the threat data.

To determine potential vulnerabilities of assets owned by an entity, a system may analyze threat data to identify the assets mentioned in the threat data and compare the identified assets with information about the owned assets. When the system determines that there is a match between the identified assets and the owned assets, the system may take corrective action to reduce the possibility that the owned assets will be compromised. For instance, the system may notify an administrator about the threat data, update an application executing on a hardware asset, or change a setting of the hardware asset or an application, to name a few examples.

The system receives priority information of the assets, e.g., from analysis of the assets, data stored on the assets, or the business use of the assets, to determine priorities for the assets. The priorities may be numerical, e.g., ten, twenty, or sixty, or the priorities may be strings, e.g., low, medium, high, or critical. In some examples, the system receives the priority information from a device operated by an administrator. For example, the system may receive data indicating input, received from the administrator, which indicates the priority information.

The system analyzes the threat data to determine the assets identified in the threat data. The system may use the identified assets to determine trends in the threat data, such as a number of occurrences that a particular asset or attribute of an asset is mentioned in the threat data. The number of occurrences may be representative of a severity of a vulnerability, a frequency with which a vulnerability is compromised, or both.

The system generates scores for the assets and the attributes of the assets using the priority information and the threat data trends. The system may take corrective action on the threat data using the generated scores. For instance, the system takes action to correct vulnerabilities identified in a particular subset of threat data, e.g., a document, with a higher score, e.g., that identifies higher priority attributes, attributes that are trending more than other attributes, or both, before eliminating other potential vulnerabilities that have a lower score, are trending less, or both.

In some implementations, the system may receive a ranking of business imperatives, e.g., goals or projects for an entity, and use the ranking to determine which threat data should be corrected first. The system may identify a particular subset of threat data that identifies an asset or a particular vulnerability of the asset and determine which of the highest ranked business imperatives uses that asset. The system performs this process for multiple subsets of threat data and vulnerabilities, and ranks the threat data according to the priority of the business imperatives that use the assets affected by a vulnerability.

The system may determine an extent to which a particular subset of threat data or vulnerability affects a business imperative. For example, when an entity has two business imperatives, the first of which uses three assets and the second of which uses five assets and the system identifies a vulnerability that affects a particular asset, used by both business imperatives, the system may determine that the vulnerability affects the first business imperative more than the second business imperative because one of three assets is affected for the first business imperative compared to one of five assets for the second business imperative.

The system may take corrective action on the subsets of threat data or the corresponding vulnerabilities, e.g., to reduce probabilities that the assets identified in the subsets of threat data will be compromised, using the ranking of the business imperatives, the extent to which a highest ranked business imperative is affected by the vulnerabilities identified in the subset of the threat data, or both. In some examples, the system may cause the presentation of a user interface, e.g., to an administrator, that includes a list of all the business imperatives affected by a particular subset of threat data or vulnerability, and the extent to which the particular subset of threat data affects the business imperatives.

In some examples, a system may use attributes of an asset when determining an order in which to take corrective action on subsets of threat data or the corresponding vulnerabilities. For example, an asset may be a particular hardware device and the attributes of the asset may include a string representing the model of the asset, a string representing a particular software application executing on the asset, e.g., an operating system or another application used by the asset, a string representing version information, e.g., for the model or the software or both, an Internet Protocol (IP) address, or any combination of two or more of these. For example, the system will assign a threat document that identifies both a model and an application of an asset a higher score than a different threat document that identifies only the model of the asset. In some examples, the system will assign a vulnerability that affects both a model and an application of an asset a higher score than a different vulnerability that affects only a model of an asset.

Vulnerabilities may include information about security vulnerabilities identified by independent research teams, internal teams, or security vendors. The security vulnerabilities may indicate particular vulnerabilities for a hardware device, an operating system, an application, or a version of an application, e.g., particular to a specific operating system or hardware device.

FIG. 1 is an example of an environment 100 in which a contextualization system 102 receives threat data from a network 104 and ranks vulnerabilities identified in the threat data. For instance, the system receives an asset inventory 106 and business imperatives 108 for an entity and uses the asset inventory 106 or both the asset inventory 106 and the business imperatives 108 to determine a ranking of threat data 110 or a ranking of the vulnerabilities in the threat data 110.

The asset inventory 106 includes a list of assets used by an entity, e.g., a company or an organization. The assets includes hardware assets used by the entity. The asset inventory 106 includes information about attributes of the assets, including hardware model, operating system, software applications installed, hardware or software version information or both, and Internet Protocol (IP) address.

The contextualization system 102 receives priority information for each of the assets. The priority information may be specific to a particular entity. In some implementations, the system may determine the priority information using the types of data associated with the assets. The priority information may be included in the asset inventory 106. In some examples, the contextualization system 102 may receive the priority information from a device operated by a user, e.g., an employee of the entity.

The contextualization system 102 receives threat data 110 from multiple sources. For instance, the contextualization system 102 may receive structured and unstructured threat data 122 from one or more sources, e.g., via the network 104, and store the threat data 110 in a database.

The contextualization system 102 analyzes the threat data 110 to determine which assets in the asset inventory 106 are identified in the threat data 110, e.g., the vulnerabilities for the determined assets, and scores for the assets. For instance, the scoring engine 112 determines which of the assets in the asset inventory 106 are identified in the threat data 110 because of potential vulnerabilities of those assets that are listed in the threat data 110. The scoring engine 112 may determine that a string that represents the model or a software application of the asset, or a similar string, e.g., an abbreviation, is included in a subset of the threat data, e.g., a document.

In some implementations, the contextualization system 102 may determine that at least a minimum portion of a string representing the name of an asset or an attribute matches a portion of a string from the threat data 110 and determine that the asset or attribute from the asset inventory 106 and the threat data 110 are the same. For instance, the system may determine that software version 4.0, identified in the asset inventory 106, and software version 4.0.1, identified in the threat data 110, represent the same attribute, e.g., for the purposes of identifying vulnerabilities and the assets affected by those vulnerabilities.

For each of the assets from the asset inventory 106 identified in the threat data 110, the scoring engine 112 determines a quantity of times the asset is mentioned in the threat data 110. For example, the scoring engine 112 determines that a first attribute is mentioned in twenty documents and that a second attribute is mentioned in eight documents.

The scoring engine 112 uses the quantity of times the asset or an asset attribute is mentioned in the threat data 110 and the priority of the asset to determine a score for the asset, asset attribute, or both. For instance, the scoring engine 112 determines scores for the assets using the priority information and boosts the scores using the quantity of times the asset or corresponding asset attributes are mentioned in the threat data 110. When a frequency of occurrences with which an asset or asset attribute is mentioned in the threat data 110 does not satisfy a threshold value, the scoring engine 112 might not adjust the score for that asset, e.g., depending on the particular threshold when multiple thresholds are used. When a frequency of occurrences with which an asset or asset attribute is mentioned in the threat data 110 satisfies a threshold value, the scoring engine 112 adjusts the score for that asset or asset attribute, or both, potentially using the quantity of times, the threshold value, or both, to determine the boost to the score.

The scoring engine 112 may use a portion of the threat data 110 associated with a particular period of time, e.g., a week or a day, when determining the boosts for the assets' scores. For example, when the scoring engine 112 analyzes threat data every day, the scoring engine may use the portion of the threat data 110 received since the previous analysis of the threat data 110, e.g., the day before. The scoring engine 112 may use the threat data 110 received in the most recent twenty-four hour time period.

In some implementations, the scoring engine 112 generates the initial scores for the assets in the asset inventory 106 and a trending engine 114 analyzes the threat data 110 to determine trends in the threat data 110, e.g., a quantity of times each of the assets or asset attributes is mentioned in the threat data 110 or a portion of the threat data 110. The trending engine 114 provides asset trend information, which corresponds to the number of times the asset or asset attribute and corresponding vulnerabilities are mentioned in the threat data 110, to the scoring engine 112 and the scoring engine 112 uses the trends to determine scores for each of the assets and asset attributes in the asset inventory 106.

A ranking engine 118 uses the scores for a particular asset, and the entity that uses the asset, to determine a ranking of vulnerabilities identified in the threat data 110, e.g., specific to the entity. In FIG. 1 the ranking is of exploit targets which take advantage of a particular vulnerability in a system. The vulnerability may be in a particular asset, e.g., that has a particular asset attribute, or a system that has a specific combination of asset attributes, such as the use of a specific software application on a particular hardware model.

The ranking engine 118 may determine a ranking A 120a for an entity A of the exploit targets that affect the entity A. For instance, the ranking engine 118 may determine that exploitation of a particular exploit target A uses vulnerabilities of particular assets or asset attributes and the combined scores of those particular assets and asset attributes is higher than the combined scores for the assets and asset attributes with vulnerabilities for an exploit target B and include exploit target A in a higher position in the ranking A 120a than the exploit target B. The ranking engine 118 may determine that some of the exploit targets, such as exploit target C, do not affect the entity A, e.g., because the entity A does not have any of the assets or asset attributes with vulnerabilities used by the exploit target C, and not include those exploit targets in the ranking A 120a.

The ranking engine 118 provides the ranking A 120a of the exploit targets, e.g., or the corresponding vulnerabilities, to a front end 116. The front end 116 generates instructions for the presentation of the ranking A 120a and provides the instructions to a device operated by a user.

In some implementations, the front end 116 may generate instructions for a user interface that includes an option to request a ranking. When the front end 116 or another component of the contextualization system 102 receives data indicating user selection of the option to request a ranking, the contextualization system 102 determines an entity associated with the request, e.g., identified with the request, such as by a user of the user interface, or an entity associated with a device which presented the user interface that included the option to request the ranking. The scoring engine 112 uses information about the entity, e.g., the asset inventory 106 for the entity and priority information for the entity's assets, to determine scores for each of the entity's assets, potentially in conjunction with the trending engine 114. In these implementations, the scoring engine 112 determines scores for each of the entity's assets in response to receipt of a request for a ranking of vulnerabilities that may affect the entity.

The ranking engine 118 uses information about an entity for which the ranking engine 118 is ranking exploit targets to determine which exploit targets are relevant to the entity. For instance, the ranking engine 118 may determine that exploit target A affects assets used by an entity A and not an entity B and include the exploit target A in the ranking A 120a and not a ranking B 120b, e.g., determined for the entity B, potentially at a different time. The ranking engine may determine that exploit target B affects assets used by both entity A and entity B and include exploit target B in both the ranking A 120a and the ranking B 120b.

In some implementations, the ranking engine 118 may use industry information when generating a ranking of exploit targets or vulnerabilities. For instance, the ranking engine 118 may determine that a particular exploit target A affects industry A and not industry B and include that exploit target A in the ranking A 120a and a ranking C 120c, both of which are for entities in the industry A, and not the ranking B 120b, for the entity B in the industry B.

In some examples, the front end 116 may receive information from a device operated by a user indicating that the exploit targets should be filtered by a particular industry, particular key words, particular entities, particular assets, particular types of vulnerabilities, or a combination of two or more of these. For instance, the front end 116 may receive data indicating that the ranking engine 118 should only rank exploit targets that affect industry B and not rank any exploit targets that are specific to other industries or that are not specific to any industry.

The ranking engine 118 may use terms or phrases to determine the industry, entity, asset, or vulnerability to which an exploit target is associated. For instance, the ranking engine 118 may determine subsets of the threat data 110, e.g., documents, that each mention a particular exploit target and the other words included in the subset of the threat data. When determining whether the particular exploit target corresponds to a particular industry, the ranking engine 118 determines whether the other words included in the subset of the threat data mention the industry by name, and entity associated with the industry, e.g., that offers products or services for the industry, or other information about the industry. If the ranking engine 118 determines that any of the subsets of the threat data 110 for the particular exploit target mention information about the industry, the ranking engine 118 includes the particular exploit target in a ranking of exploit targets for the industry. If the ranking engine 118 determines that none of the subsets of the threat data 110 for the particular exploit target mention information about the industry, the ranking engine 118 does not include the particular exploit target in a ranking of exploit targets for the industry.

In some implementations, the front end 116 may request a time period for trending information from a device operated by a user. For instance, the front end 116 may generate instructions for the presentation of a user interface that allows a user to request a ranking of exploit targets and specify a trending time period, e.g., used to determine scores for the assets and asset attributes of an entity. The user interface may include an option to upload asset inventory information, asset attribute information, asset priority information, business imperative information, business imperative priority information, or a combination of two or more of these.

In some implementations, the ranking engine 118 may rank the exploit targets based on an entity's business imperatives. For instance, the ranking engine 118 may determine the business imperatives 108 for an entity and the assets used by each of the business imperatives. The ranking engine 118 determines, for a particular exploit target, which assets are affected by the vulnerabilities for the exploit target and which of the entity's business imperatives use the affected assets.

The ranking engine 118 determines, for the particular exploit target, the highest ranked business imperative that uses at least one of the affected assets. The ranking engine 118 determines a quantity of the affected assets or a quantity of affected asset attributes, e.g., identified in data describing the particular exploit target or the corresponding vulnerabilities, as described in more detail below. The highest ranked business imperative is the most important business imperative for an entity that uses at least one of the affected assets, e.g., in an ordering of all the business imperatives 108 for the entity.

The ranking engine 118 may rank a list of exploit targets that affect business imperatives of an entity using the highest ranked business imperative affected by the exploit target. For instance, when an entity has business imperative A and business imperative B, with business imperative A having a higher rank than business imperative B, and a first exploit target only affects asset attributes for the business imperative B and a second exploit target affects asset attributes for the business imperative A and the business imperative B, the ranking engine 118 may assign the second exploit target a higher ranking than the first exploit target when generating information for presentation of the first and second exploit targets in a user interface.

The ranking engine 118 may rank a list of exploit targets that affect business imperatives of an entity using a percentage of assets or a percentage of asset attributes, for a business imperative, that are affected by an exploit target. For instance, the ranking engine 118 may determine that the business imperative B has eight asset attributes, two of which are affected by the first exploit target and five of which are affected by the second exploit target. The ranking engine 118 may determine that the business imperative A has twenty asset attributes, ten of which are affected by the second exploit target and none of which are affected by the first exploit target. The ranking engine 118 assigns the first exploit target scores of zero percent and twenty-five percent for the business imperatives A and B, respectively (0/20 attributes=0%; 2/8 attributes=25%). The ranking engine assigns the second exploit target scores of fifty percent and sixty-two point five percent for the business imperatives A and B respectively (10/20 attributes=50%; 5/8 attributes=62.5%).

The ranking engine 118 generating a ranking of the exploit targets with the second exploit target having a higher ranking than the first exploit target because fifty percent for the second exploit target, selected since the business imperative A has a higher rank than the business imperative B, is greater than twenty-five percent for the first exploit target. In some implementations, if the score for the first exploit target is sixty percent, or another number greater than fifty percent, the ranking engine 118 assigns the first exploit target a higher rank than the second exploit target.

In some implementations, the ranking engine 118 may weight scores for the exploit targets using a ranking of the business imperatives. When ranking the exploit targets using a percentage of the assets or a percentage of the asset attributes that are affected by an asset attribute, the ranking engine 118 weights the scores using a location of the corresponding business imperative in the list of business imperatives. For instance, when the list includes two business imperatives, and an unweighted score of twenty-five percent for a particular exploit target that affects the second ranked business imperative, the weighted score may be twelve point five percent (25%*1/2=12.5%). Scores for the first ranked business imperative would be unweighted, or modified by a weight of one, e.g., 25%*1=25%.

When the list includes five business imperatives, a score for the third business imperative would be fifteen percent (25%*3/5), a score for the fourth business imperative would be ten percent (25%*2/5), and a score for the fifth business imperative would be five percent (25%*1/5), all for an unmodified score of twenty-five percent. In these examples, the ranking engine 118 uses the method [unmodified score]*[(total number of business imperatives−rank of the particular business imperative+1)/total number of business imperatives]. The ranking engine 118 may use any appropriate method to determine weights for the scores using the ranking of the business imperatives.

The ranking engine 118 provides information about the ranking of the exploit targets, using the business imperatives of an entity, to the front end 116. The front end 116 generates instructions for presentation of a user interface with the exploit targets ranked using the business imperatives and provides the instructions to a device operated by a user.

In some implementations, the front end 116 generates instructions for presentation of an exploit target and includes information about the threat data 110 used to determine the exploit target. For instance, the user interface may include an option that, when selected, causes the user interface to identify the documents from the threat data 110 that includes information about the vulnerability or vulnerabilities for the exploit target.

The network 104, such as a local area network (LAN), wide area network (WAN), the Internet, or a combination thereof, connects the contextualization system 102 with sources of the structured and unstructured threat data 122.

FIGS. 2A-E show a flow diagram of a process for updating an asset inventory in response to a change in an entity's computer assets. For example, the process can be used by the contextualization system 102 from the environment 100.

At time $T_1$, a system receives an asset inventory 202 and business imperatives 204 for an entity. The system may receive information that identifies a particular industry in which the entity offers products or services.

The asset inventory 202 includes multiple attributes 206 for each asset. The attributes may include a hardware model, a software name, e.g., for a software application executing on the hardware model, a version, e.g., for the software application or for the hardware model, and an Internet Protocol address, to name a few examples.

The asset inventory 202 includes a criticality 208 that indicates how important the corresponding asset is to the entity. For instance, the criticality 208 may be low, medium, high, or critical. The system may use the string criticality values to determine numerical ratings 210 for each of the assets. For example, the system may assign low criticality assets a rating of twenty, medium criticality assets a rating of fifty, high criticality assets a rating of eighty, and critical assets a rating of one hundred. The system may use any appropriate method to determine the numerical ratings 210 for the assets, such as receiving the numerical rating information from a user.

The asset inventory 202 or the business imperatives 204 may include a mapping 212 of which assets are used for which business imperatives. The example shown in FIG. 2A includes the mapping 212 in the asset inventory 202 and indicates, for each of the assets, which business imperatives use the corresponding asset. In some examples, the business imperatives 204 may indicate, for each of the business imperatives, the asset identifiers for the assets used by the business imperative.

The business imperatives 204 include an imperative identifier 214. In some examples, the imperative identifier 214 indicates a ranking of the business imperatives, e.g., so that business imperatives with a lower imperative identifier 214 have a higher rank than business imperatives with a higher imperative identifier 214. The system may use any appropriate data to indicate a ranking of the business imperatives 204 from lowest priority to highest priority.

At time $T_2$, the system determines asset relevance scores using the asset ratings. For example, for each asset, the system determines a relevance score for each of the attributes 206 of the asset. The relevance score may be a reflection of how important each of the attributes is to a particular asset or how important a type of attribute is to an asset. In some examples, the system may divide the asset rating evenly between the attributes. The system may use five percent of a rating as the relevance score for a first attribute, e.g., a hardware model, forty percent of the rating as the relevance score for a second attribute and a third attribute, e.g., a software application name and a software version, and fifteen percent of the rating as a relevance score for a fourth attribute, e.g., an Internet Protocol address.

At time $T_3$, as shown in FIG. 2B, the system determines trends in threat data. The system may determine a quantity of documents that mention particular asset attributes, such as hardware models, software application names, software versions, or Internet Protocol addresses. For example, the system may receive threat data over a period of time, e.g., hours, days, weeks, months, or years, store the threat data in a database, and determine trends in the threat data. The system may analyze a subset of the threat data when determining the trends. For instance, the system may analyze threat data for a predetermined period of time, e.g., the past day, two days, week, two weeks, or month. In some examples, the system determines trends in the threat data in response to receipt of a request for presentation of a list of vulnerabilities that may affect an entity.

At time $T_4$, the system uses information about the trends to update the asset relevance scores. For instance, the system uses the quantity of documents in which the attributes 206 are mentioned to determine a boost to a relevance score for the corresponding attribute.

In some examples, the system may boost a relevance score by five for an attribute that is mentioned a small number of times, e.g., greater than zero and less than a first threshold amount. The system may boost a relevance score by ten for an attribute that is mentioned a median number of times, e.g., greater than or equal to the first threshold amount and less than a second threshold amount. The system may boost an attribute's relevance score by twenty when the attribute is mentioned many times in the documents of the threat data, e.g., when the attribute is mentioned at least the second threshold amount of times.

The system updates the numerical ratings 210 and the criticalities 208 of the assets in the asset inventory. For instance, the system adds a boost value to the corresponding numerical rating 210 and determines whether the corresponding criticality 208 should be updated. When the system determines that the numerical rating 210 has changed and represents a new criticality value, e.g., by increasing from eighty to one hundred, the system updates the corresponding criticality 208, e.g., by changing the criticality from "high" to "critical."

The system, at time $T_5$, determines business imperative scores for each of the entity's business imperatives using the attributes affected by the vulnerabilities, e.g., the exploit targets. The business imperative scores are not specific to a particular vulnerability. The business imperative scores are general scores for assets and the asset attributes.

For instance, the system determines each of the business imperatives for an entity and the assets and asset attributes used by the business imperative. In some examples, only some of the asset attributes for a particular asset may be used by a business imperative. In these examples, the business imperative may not identify each of the asset attributes for the particular asset as being required for the business imperative. In some examples, each business imperative requires all of the attributes for a corresponding asset used by the business imperative.

For each of the business imperatives, the system determines a total number of asset attributes used by the business imperative and assigns each of the attributes a score determined used the total number of asset attributes used by the business imperative. For example, when a particular business imperative, e.g., business imperative four, uses two assets and each of those assets has four attributes, for a total of eight attributes, the system may assign each attribute a score of twelve point five (12.5).

The business imperative scores may represent, for each of the attributes, a percentage upon which a corresponding business imperative depends on the attribute. When the business imperative depends on eight attributes, each of the attributes contributes twelve point five percent of the assets used by the attribute, out of a total of one hundred percent.

In some implementations, the system may weight the business imperative scores, e.g., using a degree to which the business imperative uses the attributes, the importance of the attributes, or some other method. The system may use any appropriate method to determine the business imperative scores, weights for the business imperative scores, or both.

Figure 2C:
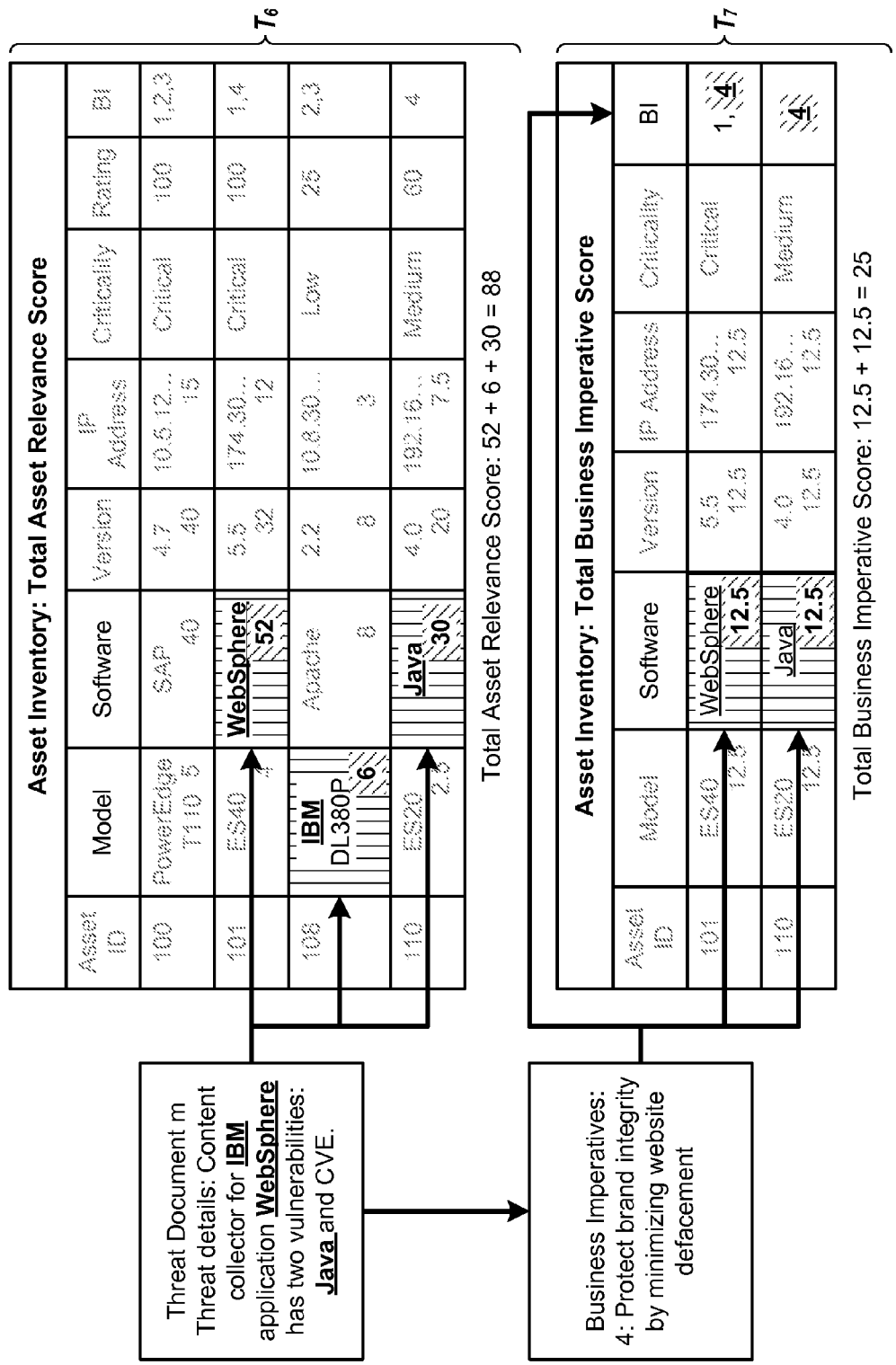

At time $T_6$, as shown in FIG. 2C, the system determines a total asset relevance score for a particular vulnerability. The system may use one or more threat documents, e.g., subsets of threat data, to determine the total asset relevance score. For instance, the system may determine all of the threat documents that mention a particular vulnerability and the assets or asset attributes mentioned with respect to the particular vulnerability. The system may determine that, for vulnerability A, attributes A, B, and C are mentioned in threat document m. The system combines, e.g., adds, the relevance scores for attributes A, B, and C to determine the total asset relevance score for the particular vulnerability A.

In some examples, the system may determine that threat document n mentions the particular vulnerability A and attributes B, C, and D. The system may combine, e.g., add, the relevance scores for the attributes A, B, C, and D to determine the total asset relevance score for the particular vulnerability A based on the attributes mentioned for the particular vulnerability A in the threat document m and the threat document n.

At time $T_7$, the system determines a total business imperative score for the particular vulnerability. The system may determine multiple total business imperative scores for the particular vulnerability, e.g., one score for each of an entity's business imperatives. When the system determines multiple total business imperative scores, the system may select a score for the highest ranked business imperative or the total highest business imperative score. In some implementations, the system may rank the affected business imperatives, e.g., from a highest score to lowest score.

For instance, the system determines which assets a business imperative uses and the attributes for those assets. The system determines, for a particular vulnerability, which of the determined attributes correspond to the vulnerability, e.g., are identified in a document that indicates the vulnerability and how the vulnerability affects particular assets.

The system combines, e.g., adds, the scores for the determined attributes that correspond to the vulnerability to determine a total business imperative score for the business imperative.

The system generates instructions for presentation of a user interface 216 and, at time $T_8$, causes presentation of the user interface 216, shown in FIG. 2D. The user interface 216 includes a list of exploit targets 218, e.g., vulnerabilities, affected assets 220, and asset relevance scores 222 and business imperative scores 224 for the corresponding exploit targets 218.

The user interface 216 allows a user to rank the exploit targets, e.g., the vulnerabilities, by either the asset relevance scores 222 or the business imperative scores 224. For instance, the user interface 216 includes controls that, in response to user selection of the control, rank the exploit targets by asset relevance score 222 or business imperative score 224.

The user interface 216 indicates the affected assets 220 that are impacted by the corresponding vulnerability. The affected assets 220 may be identifiers for the assets, the names of the assets, or some other information associated with the assets, e.g., identifiers for the affected attributes. The user interface 216 may allow selection of each of the affected assets 220 and, in response to receipt of data indicating selection of an affected asset, may cause the presentation of information about the selected asset.

The user interface 216 may help an administrator determine which vulnerabilities are most important to a particular entity, e.g., the entity that employs the administrator, and should be acted on first. For instance, the user interface 216 may help an administrator to allocate resources to determine solutions for vulnerabilities that affect an entity's assets, e.g., to allocate resources to the most important vulnerabilities first.

In some implementations, when the exploit targets 218 are sorted by business imperative score 224, the user interface 216 may highlight the affected assets 220 used by the business imperative. For instance, when the exploit target m has three affected assets, two of which correspond to the business imperative four, e.g., asset identifiers 101 and 110, the user interface 216 may determine that the exploit targets 218 are sorted by business imperative score 224 and highlight, or otherwise distinguish, the two affected assets used by the business imperative four. In some implementations, when the user interface 216 determines that a mouse is hovering over a business imperative score, the user interface 216 may cause the assets used by the corresponding business imperative to be highlighted in the user interface 216.

In some implementations, the user interface 216 may include an option to present all business imperatives affected by a corresponding vulnerability or exploit target to a user. In response to selection of the option, the user interface 216 determines all of the entity's business imperatives affected by the exploit target and presents a list of the determined business imperatives and the corresponding scores, e.g., ranked according to the scores, from highest to lowest, or by business imperative ranking. In some implementations, the user interface 216 may indicate the affected assets used by the business imperatives in the presentation of the list of the affected business imperatives. In some examples, when only a single business imperative is affected by an exploit target, the user interface 216 does not include an option to view a list of affected business imperatives.

In response to selection of a particular exploit target 218, the user interface 216, at time $T_9$, may cause the presentation of a second user interface 226 with information about the selected exploit target. The second user interface 226 may include information from one or more documents with details about a vulnerability for the exploit target, the assets, asset attributes, or both, affected by the vulnerability, and potential solutions to remove the vulnerability.

The second user interface 226 may include an option to create a service ticket 228. In response to receipt of data indicating a selection of the option to create a service ticket 228, the second user interface 226 may generate instructions for solutions to remove the vulnerability. In some examples, the second user interface 226 may send a request to the system to cause the system to generate the instructions for solutions to remove the vulnerability.

In some implementations, the second user interface 226 may include an option to accept a risk of not mitigating a corresponding vulnerability. For instance, the system, upon receiving data indicating user selection of the option to accept the risk of not mitigating a vulnerability will remove the information about the vulnerability, and corresponding exploit target, from the user interface 216. In some examples, the system maintains data about the vulnerability in a database but flags the vulnerability so that the vulnerability is no longer presented in the user interface 216 in response to requests for vulnerabilities for an entity. The flag to no longer present information about a particular vulnerability is specific to a particular entity.

The system may automatically, without user input, determine a solution to the vulnerability, such as installing a software update or changing an Internet Protocol address, and cause the solution to be implemented. For instance, the system may communicate with one of the affected assets to provide the affected asset with instructions to update a software application.

As shown in FIG. 2E, the system may determine, at time $T_{10}$, that a solution to the vulnerability for the selected exploit target is to update a software application from version 5.5 to version 6.0. At time $T_{11}$, the system may cause the software application to update, e.g., by sending instructions to the hardware asset executing the software application that cause the hardware asset to download the update to the software application and install the update.

At time $T_{12}$, the system updates the asset inventory 202 to reflect the changes caused by implementation of the solution to remove the vulnerability. For instance, the system sends instructions to a database at time $T_{12}$ to cause the database to update the asset inventory 202 to reflect the changes and, at time $T_{13}$, the database updates the asset inventory. The update indicates the change in the software application from version 5.5 to version 6.0.

The order of steps in the process described above is illustrative only, and updating the asset inventory in response to the change in the entity's computer assets can be performed in different orders. For example, the system may determine the business imperative scores before determining the asset relevance scores, determine the total business imperative scores before determining the total asset relevance scores, or both.

In some implementations, the process can include additional steps, fewer steps, or some of the steps can be divided into multiple steps. For example, the system may determine the asset relevance score and total asset relevance score, or the business imperative score and total business imperatives score, and not both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
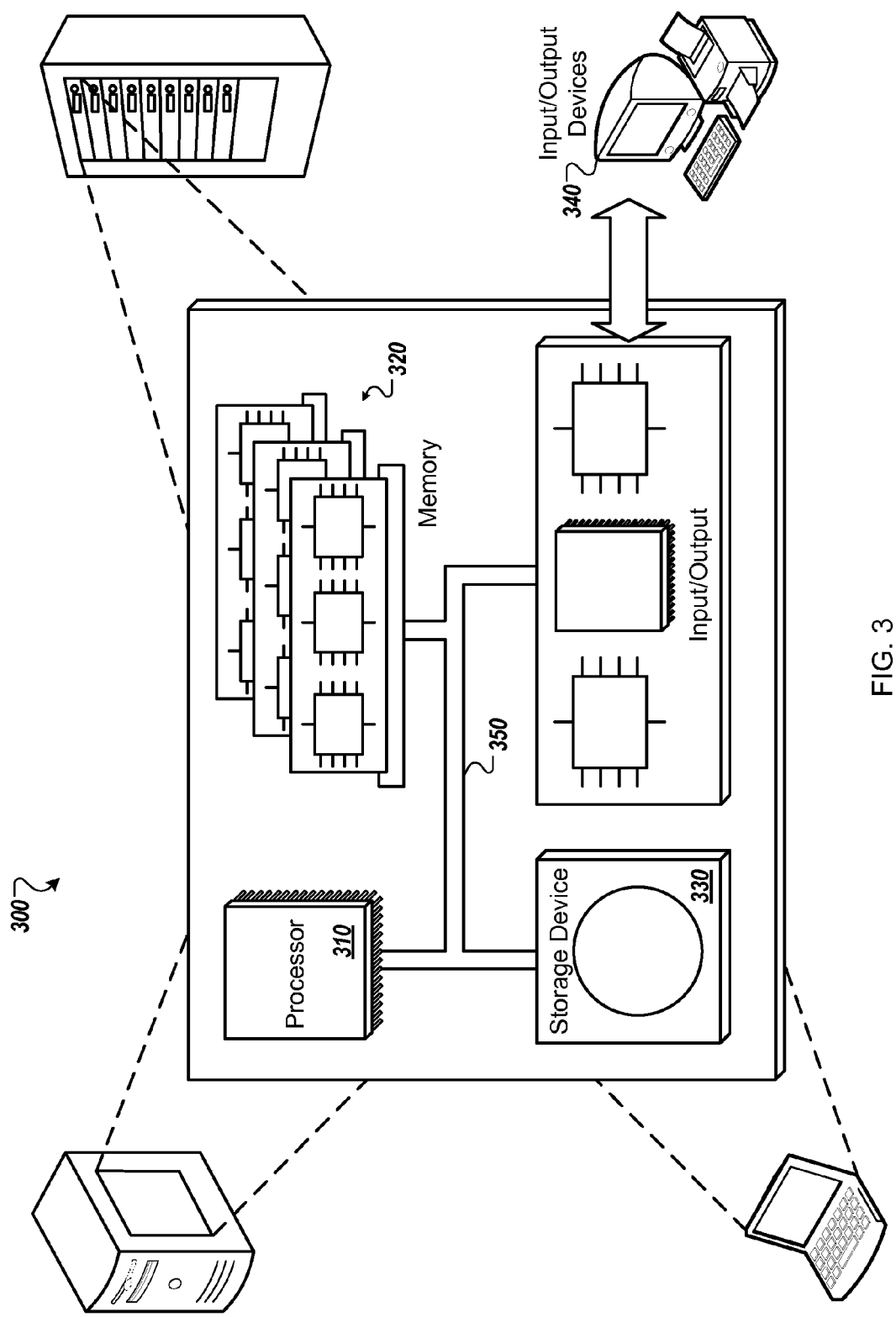
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   a data processing apparatus; and
   a non-transitory computer readable storage medium in data communication with the data processing apparatus and storing instructions executable by the data processing apparatus and upon such execution cause the data processing apparatus to perform operations comprising:
   receiving data that identifies an entity's computer assets, attributes for each of the entity's computer assets, and respective relevance ratings for each of the attributes for the entity's computer assets;
   receiving threat data that identifies vulnerabilities of particular attributes, the threat data comprising two or more subsets of threat data each of which identifies a vulnerability of a different one of the particular attributes;
   determining, by analyzing the threat data, vulnerability trends for the particular attributes;
   determining, for each of the attributes, whether the attribute is one of the particular attributes identified in the threat data;
   for each of the attributes that is one of the particular attributes identified in the threat data:
   determining a weight for the respective relevance rating of the corresponding attribute using the vulnerability trends for the corresponding attribute; and
   determining an updated relevance rating of the corresponding attribute by combining the weight with the respective relevance rating;
   for each of two or more vulnerabilities identified in the threat data:
   determining the particular attributes affected by the vulnerability; and
   determining a score for the vulnerability by combining the updated relevance ratings for each of the particular attributes affected by the vulnerability;
   generating a ranking of the two or more vulnerabilities using the corresponding scores;
   generating instructions for presentation of a user interface that identifies each of the two or more vulnerabilities according to the ranking;
   providing the instructions to a device to cause the device to present the user interface to a user to allow the user to change the entity's computer assets or the attributes of the entity's computer assets based on the vulnerabilities; and
   receiving an indication of a change to the entity's computer assets or the attributes of the entity's computer assets.

2. The system of claim 1, the operations comprising:
   receiving, from a device, a request for presentation of threat information to a user, wherein determining, by analyzing the threat data, the vulnerability trends for the particular attributes comprises determining, by analyzing the threat data, the vulnerability trends for the particular attributes in response to receiving the request for presentation of the threat information to a user.

3. The system of claim 1, the operations comprising:
   updating, for the entity's computer asset that includes the changed attribute, the updated relevance rating in response to receiving the indication of the change to the attributes of the entity's computer assets.

4. The system of claim 1, wherein:
the relevance ratings for each of the attributes for the entity's computer assets comprise asset relevance ratings;
receiving the data that identifies the entity's computer assets, the attributes for each of the entity's computer assets, and the respective relevance ratings for each of the entity's computer assets comprises receiving data that identifies an entity's computer assets, attributes for each of the entity's computer assets, which of the entity's computer assets and corresponding attributes are used for each of the entity's business imperatives, and respective relevance ratings for each of the attributes for the entity's computer assets, wherein at least one of the entity's business imperatives identifies two or more of the attributes for the entity's computer assets that are used for a goal or a project of the entity, the operations comprising:
for each of the entity's business imperatives:
determining the attributes used by the business imperative; and
determining, for each of the attributes used by the business imperative, a business imperative relevance rating for the attribute using a quantity of attributes used by the business imperative; and
determining, for each of two or more vulnerabilities identified in the threat data, a business imperative score for the vulnerability by combining the business imperative relevance ratings for each of the particular attributes affected by the vulnerability.

5. The system of claim 4, wherein determining, for each of the attributes used by the business imperative, a business imperative relevance rating for the attribute comprises determining, for each of the attributes used by a highest priority business imperative included in the entity's business imperatives that uses at least one of the particular attributes affected by the vulnerability, the business imperative relevance rating for the particular attribute using a total quantity of attributes used by the highest priority business imperative.

6. The system of claim 4, wherein receiving the data that identifies the entity's computer assets, attributes for each of the entity's computer assets, which of the entity's computer assets and corresponding attributes are used for each of the entity's business imperatives, and the respective relevance ratings for each of the attributes for the entity's computer assets comprises:
providing, for presentation to a user, a user interface for input of identifiers for the entity's computer assets, the asset relevance ratings and the attributes for each of the entity's computer assets, and the business imperatives;
receiving the data including the identifiers for the entity's computer assets, the asset relevance ratings and the attributes for each of the entity's computer assets, and the business imperatives in response to user interaction with the user interface; and
determining, using the asset relevance ratings for each of the entity's computer assets, the respective relevance ratings for each of the attributes for the corresponding computer asset.

7. The system of claim 1, wherein receiving the threat data that identifies the vulnerabilities of the particular attributes comprises:
receiving structured threat data or unstructured threat data from a computer connected to the data processing apparatus by a network connection; and
parsing the structured threat data or the unstructured threat data to determine the vulnerabilities and the particular attributes identified in the threat data.

8. The system of claim 1, wherein:
determining, by analyzing the threat data, the vulnerability trends for the particular attributes comprises determining, for each of the particular attributes, a quantity of times the particular attribute is identified in the threat data with a vulnerability to which the particular attribute corresponds; and
determining the weight for the respective relevance rating of the corresponding attribute using the vulnerability trends for the corresponding attribute comprises determining the weight for the respective relevance rating of the corresponding attribute using the quantity of times the particular attribute is identified in the threat data with the vulnerability to which the particular attribute corresponds.

9. The system of claim 1, wherein determining, for each of the attributes, whether the attribute is one of the particular attributes identified in the threat data comprises:
comparing, for each of the attributes, a name for the attribute or an alternate spelling of the name for the attribute with a string, for each of the particular attributes, from the threat data that identifies the particular attribute; and
determining, for each of the attributes, that the attribute is one of the particular attributes when the name or the alternate spelling of the name is the same as one of the strings that identifies a corresponding one of the particular attributes.

10. The system of claim 1, wherein:
determining, by analyzing the threat data, the vulnerability trends for the particular attribute comprises determining a quantity of times the particular attribute is identified in the threat data with a vulnerability to which the particular attribute corresponds;
determining the weight for the respective relevance rating of the corresponding attribute using the vulnerability trends for the attribute comprises:
determining whether the quantity of times the attribute is identified in the threat data satisfies a threshold value; and
selecting a first weight in response to determining that the quantity of times the attribute is identified in the threat data satisfies the threshold value; or
selecting a second weight in response to determining that the quantity of times the attribute is identified in the threat data does not satisfy the threshold value; and
determining the updated relevance rating by combining the weight with the respective relevance rating comprises adding the selected weight value to the respective relevance rating to determine the updated relevance rating for the corresponding attribute.

11. The system of claim 1, the operations comprising:
determining a particular industry for the entity;
determining, for each of the subsets of threat data, an industry for the subset of threat data; and
including, for each of the subsets of threat data with an industry that is the same as the particular industry, the subset of threat data in the ranking.

12. The system of claim 1, wherein receiving the data that identifies the entity's computer assets, the attributes for each of the entity's computer assets, and the respective relevance ratings for each of the attributes for the entity's computer assets comprises receiving data representing user input indicating the respective relevance ratings for each of the entity's computer assets.

13. A non-transitory computer readable storage medium storing instructions executable by a data processing apparatus and upon such execution cause the data processing apparatus to perform operations comprising:
receiving data that identifies an entity's computer assets, attributes for each of the entity's computer assets, and respective relevance ratings for each of the attributes for the entity's computer assets;
receiving threat data that identifies vulnerabilities of particular attributes, the threat data comprising two or more subsets of threat data each of which identifies a vulnerability of a different one of the particular attributes;
determining, by analyzing the threat data, vulnerability trends for the particular attributes;
determining, for each of the attributes, whether the attribute is one of the particular attributes identified in the threat data;
for each of the attributes that is one of the particular attributes identified in the threat data:
determining a weight for the respective relevance rating of the corresponding attribute using the vulnerability trends for the corresponding attribute; and
determining an updated relevance rating of the corresponding attribute by combining the weight with the respective relevance rating;
for each of two or more vulnerabilities identified in the threat data:
determining the particular attributes affected by the vulnerability; and
determining a score for the vulnerability by combining the updated relevance ratings for each of the particular attributes affected by the vulnerability;
generating a ranking of the two or more vulnerabilities using the corresponding scores;
generating instructions for presentation of a user interface that identifies each of the two or more vulnerabilities according to the ranking;
providing the instructions to a device to cause the device to present the user interface to a user to allow the user to change the entity's computer assets or the attributes of the entity's computer assets based on the vulnerabilities; and
receiving an indication of a change to the entity's computer assets or the attributes of the entity's computer assets.

14. The computer readable storage medium of claim 13, the operations comprising:
receiving, from a device, a request for presentation of threat information to a user, wherein determining, by analyzing the threat data, the vulnerability trends for the particular attributes comprises determining, by analyzing the threat data, the vulnerability trends for the particular attributes in response to receiving the request for presentation of the threat information to a user.

15. The computer readable storage medium of claim 13, the operations comprising:
updating, for the entity's computer asset that includes the changed attribute, the updated relevance rating in response to receiving the indication of the change to the attributes of the entity's computer assets.

16. A computer-implemented method comprising:
receiving data that identifies an entity's computer assets, attributes for each of the entity's computer assets, and respective relevance ratings for each of the attributes for the entity's computer assets;
receiving threat data that identifies vulnerabilities of particular attributes, the threat data comprising two or more subsets of threat data each of which identifies a vulnerability of a different one of the particular attributes;
determining, by analyzing the threat data, vulnerability trends for the particular attributes;
determining, for each of the attributes, whether the attribute is one of the particular attributes identified in the threat data;
for each of the attributes that is one of the particular attributes identified in the threat data:
determining a weight for the respective relevance rating of the corresponding attribute using the vulnerability trends for the corresponding attribute; and
determining an updated relevance rating of the corresponding attribute by combining the weight with the respective relevance rating;
for each of two or more vulnerabilities identified in the threat data:
determining the particular attributes affected by the vulnerability; and
determining a score for the vulnerability by combining the updated relevance ratings for each of the particular attributes affected by the vulnerability;
generating a ranking of the two or more vulnerabilities using the corresponding scores;
generating instructions for presentation of a user interface that identifies each of the two or more vulnerabilities according to the ranking;
providing the instructions to a device to cause the device to present the user interface to a user to allow the user to change the entity's computer assets or the attributes of the entity's computer assets based on the vulnerabilities; and
receiving an indication of a change to the entity's computer assets or the attributes of the entity's computer assets.

17. The method of claim 16, comprising:
receiving, from a device, a request for presentation of threat information to a user, wherein determining, by analyzing the threat data, the vulnerability trends for the particular attributes comprises determining, by analyzing the threat data, the vulnerability trends for the particular attributes in response to receiving the request for presentation of the threat information to a user.

18. The method of claim 16, comprising:
updating, for the entity's computer asset that includes the changed attribute, the updated relevance rating in response to receiving the indication of the change to the attributes of the entity's computer assets.

19. The system of claim 1, wherein determining the weight for the respective relevance rating of the corresponding attribute using the vulnerability trends for the corresponding attribute comprises determining, for each of the attributes that is one of the particular attributes identified in the threat data, the weight for the respective relevance rating of the corresponding attribute using a quantity of documents in the threat data that identify the corresponding attribute.

20. The system of claim 4, wherein determining, for each of the attributes used by the business imperative, the business imperative relevance rating for the attribute using the quantity of attributes used by the business imperative comprises determining, for each of the attributes used by the business imperative, the business imperative relevance rating that indicates a percentage to which the business imperative uses the attribute compared to the other attributes used by the business imperative.

21. The system of claim 4, wherein determining, for each of the attributes used by the business imperative, the business imperative relevance rating for the attribute using the quantity of attributes used by the business imperative comprises:
   determining a total quantity of attributes used by the business imperative; and
   assigning, to each of the attributes used by the business imperative, a business imperative relevance rating that indicates a percentage for the attribute out of the total quantity of attributes.

* * * * *

UNITED STATES PATENT AND TRADEMARK OFFICE
CERTIFICATE OF CORRECTION

PATENT NO. : 9,886,582 B2
APPLICATION NO. : 14/841048
DATED : February 6, 2018
INVENTOR(S) : Elvis Hovor et al.

It is certified that error appears in the above-identified patent and that said Letters Patent is hereby corrected as shown below:

On the Title Page

Column 1, item (73) Assignee, delete "Sevices" and insert -- Services --, therefor.

Signed and Sealed this
Twenty-fourth Day of April, 2018

Andrei Iancu
*Director of the United States Patent and Trademark Office*